Sept. 6, 1966 P. C. SCURIS 3,271,065
EXPANDIBLE HOUSE TRAILER
Filed April 23, 1964 3 Sheets-Sheet 2

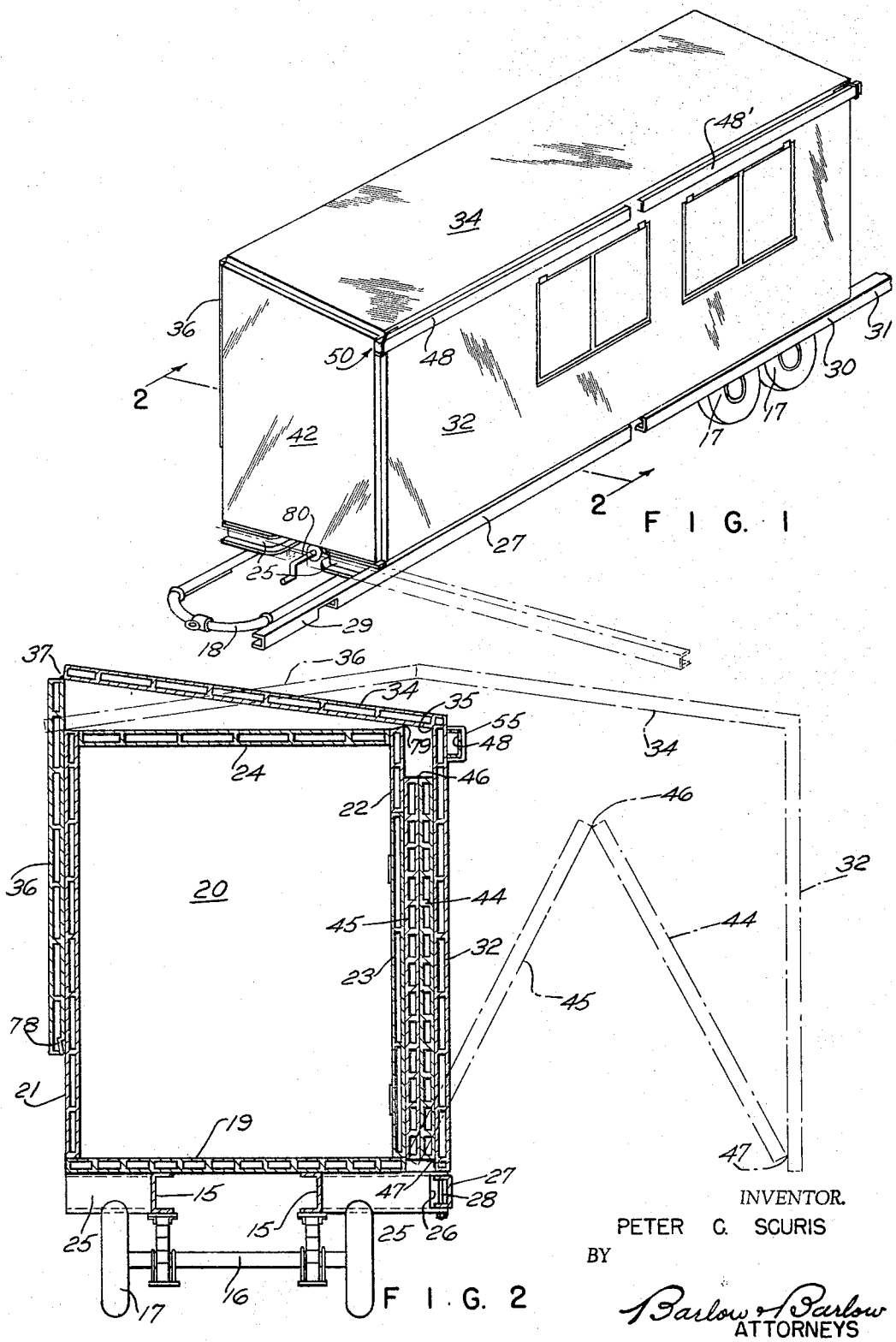

INVENTOR.
PETER C. SCURIS
BY
Barlow + Barlow
ATTORNEYS

Sept. 6, 1966 P. C. SCURIS 3,271,065
EXPANDIBLE HOUSE TRAILER
Filed April 23, 1964 3 Sheets-Sheet 3
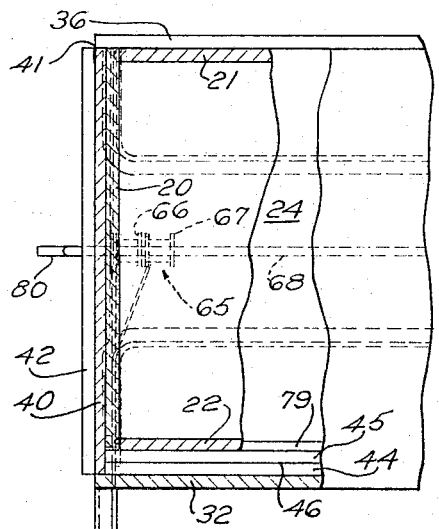
FIG. 11
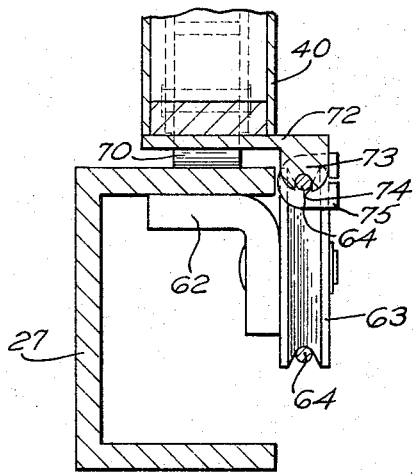
FIG. 9
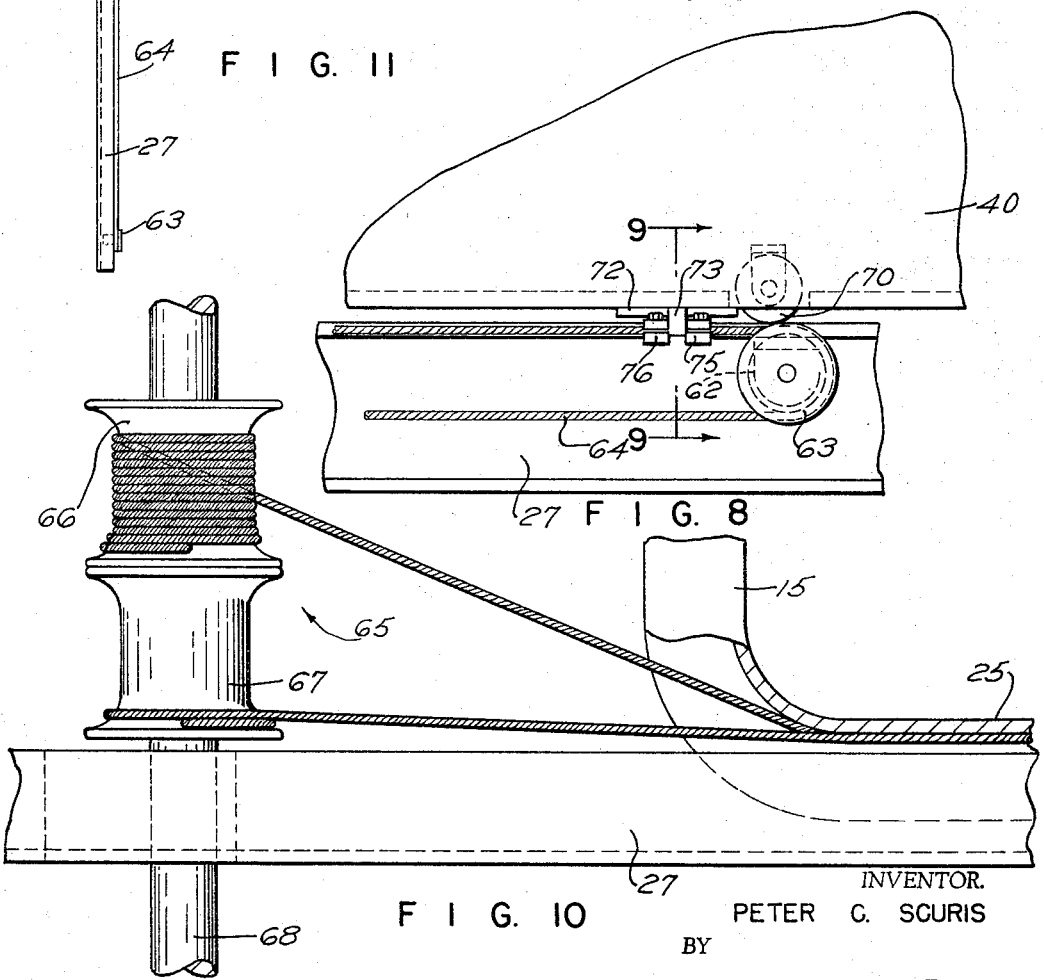
FIG. 8
FIG. 10
INVENTOR.
PETER C. SCURIS
BY
Barlow & Barlow
ATTORNEYS

United States Patent Office 3,271,065
Patented Sept. 6, 1966

3,271,065
EXPANDIBLE HOUSE TRAILER
Peter C. Scuris, 21 Colonial St., Hartford, Conn.
Filed Apr. 23, 1964, Ser. No. 361,982
5 Claims. (Cl. 296—23)

This invention relates to house trailers or mobile homes of the type which are towed from location to location by a conventional automotive vehicle in collapsed condition and then expanded to provided more than twice the floor space of the trailer when in unexpanded form. More particularly it relates to a novel and improved form of a laterally expansible trailer.

In mobile expandible homes, the prior structures generally consists of a rigid framework with side portions which may be extended in order to provide additional floor space when desired. The desire for this type of home comes about since there are certain width limitations on highways, and the only feasible way of maintaining a constant width and to provide additional room is to lengthen the trailer or mobile home. In this form, however, the mobile homes are inconvenient to occupy and require a considerable amount of space when they are erected and also are rather clumsy to handle on the highway.

It is therefore a principal object of this invention to provide a house trailer or mobile home which is collapsible to a size convenient for towing behind an automotive vehicle and which in its unfolded condition is more than twice the normal width thereof.

Another object of the invention is to provide an end wall having an upper edge conforming to the pitch of a roof all in one section.

A further object of this invention is to provide a mobile home in which the lateral bracing members are carried by the permanent structure of the house trailer and which will swing into lateral position forming a trackway for the expansion of the walls.

A still further object of the invention is to provide an expansible mobile home in which the floor and roof members are adapted to fold as well as the end wall structures.

With these and other objects in view the invention consists of certain novel features of construction as will be more fully described and particularly pointed out in the appended claims.

In the drawings, FIG. 1 is a perspective view of a house trailer made in accordance with the present invention in folded condition ready for transport;

FIG. 2 is a transverse sectional view taken substantially on line 2—2 of FIG. 1 with the sections in folded position and showing in broken line the manner in which the trailer expands laterally;

FIG. 8 is an elevation of a fragmental portion showing the cable for moving an end wall;

FIG. 9 is a section on line 9—9 of FIG. 8;

FIG. 10 is a plan view showing the winches for expanding a trailer section; and

FIG. 11 is a sectional view of a portion at the forward end of the trailer.

Figures 3, 4, 5, 6, 7:
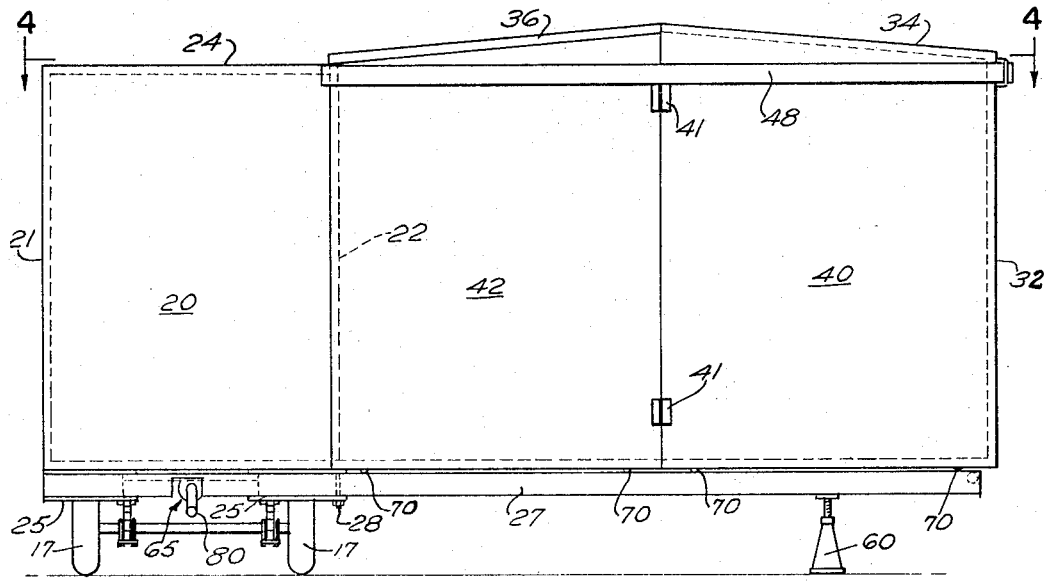
FIG. 3 is an end view of the trailer in fully expanded condition.
FIG. 4 is a sectional view on lines 4—4 of FIG. 3 showing in phantom the manner in which the braces for the side walls are engaged therewith.
FIG. 5 is an enlarged sectional view taken along the bottom edge of the lateral walls showing the track that is formed for rolling the walls out into position.
FIG. 6 is a perspective view of a fragmental portion showing a detail of a hinge mounting.
FIG. 7 is a sectional view of a fragmental detail of the mounting of a bracing bar.

Referring now to the drawings, 15 designates a conventional longitudinal frame on which the elements comprising the complete trailer unit are supported. The frame 15 is preferably fabricated from steel structural elements such as channel iron. This frame is suitably supported in any desired manner on axles such as 16 which have journaled at either end thereof wheels 17. Extending from the frame 15 is a hitch portion 18 to detachably connect the house trailer with a towing vehicle. Rigidly secured to the frame 15 is a floor 19 and upstanding therefrom are end walls 20 and a longitudinal side wall 21 connecting the two end walls 20. Opposite the longitudinal side wall 21 is another side wall 22 which may have one or more openings therein such as is provided by a door 23 (see FIG. 2) for access to another room formed by the expandible portion of the trailer. Tying the longitudinal side walls 21 and 22 together as well as the end walls 20 is a primary roof 24.

The frame 15 includes lateral members 25 at either end thereof and a number of other intermediate lateral members not shown consistent with providing the requisite rigidity to the entire structure as it is mounted on the wheeling structure. The lateral frames 25, preferably constructed of channel iron, have a notch 26 (FIG. 2) carved out at one end thereof. Received within the notch 26 is channel beam 27 which is pivotally related thereto as by a pin 28. A similar structure is at the other end of the house trailer comprising a channel beam 30, and each of these beams 27 and 30 are pivoted intermediate their ends so as to have overhanging portions 29 and 31. Under normal conditions with the house trailer in contracted form as shown in FIG. 1 these beams 27 and 30 are parallel to the longitudinal extent of the frame of the trailer and in this position serve to support the laterally movable auxiliary longitudinal side wall 32 which wall is suitably formed with sufficient longitudinal bracing to provide the necessary rigidity thereto.

Connected to the upper edge of the longitudinal side wall 32 is a roof member 34 which is attached to the side wall 32 so that the planes of each intersect at an oblique angle as at 35. Hingedly connected to the free edge of the roof 34 is another roof member 36 the hinge connection being made as at 37 along the entire longitudinal extent thereof. Secured to each end of the longitudinal wall 32 is an extensible section end wall 40 and hingedly secured to the end wall 40 as at 41 is an auxiliary end wall portion 42. Each of the end walls 40 and 42 are characterized by having the upper edges thereof conform to the pitch of the roof 34, each section being reversely pitched relative to the other so that a peaked roof structure is provided in the opened condition such as shown in FIG. 3, with the roof sections 34 and 36 assuming a proper pitched attitude. Basically, therefore, there is a telescoping section comprising the auxiliary longitudinal wall 32, end walls 40 and roof member 34, all of which are joined together and which have hingedly related thereto auxiliary end wall portions 32 and roof portion 36. Auxiliary floor members 44 and 45 are hingedly mounted to each other as at 46 and to the inner portion of the wall 32 as at 47. This telescoping section provides another room when in expanded position.

To provide lateral stability to the structure when in opened position, there is hingedly related to the walls 40 and 42 bracing means 48 and 48' (FIG. 1) which repose along side wall 32 when in collapsed position. Referring to FIG. 4, it will be seen that the brace 48 is pivotally related as at 50 to the end of the wall 42. More particularly, this pivotal relationship is as shown in FIG. 6 of the drawing in which a pintle mounting 51 is shown as being fastened by a plate 52 to the edge of the wall 42.

The sliding relationship of the other end of the member 48 is shown in greater detail in FIG. 7 of the drawing which is a fragmentary view of the corner section of where the walls 32 and 40 join. Here it will be seen that a bail member 53 is secured to the wall 32 as by bolts 54 and has a looping portion thereof 55 which extends away from the wall 32 at an obtuse angle. The brace member 48 is provided with a pin 56 which serves as an abutment for the member 48 to prevent its further sliding movement and to provide a tension when in working expanded position, all as shown in FIG. 4 of the drawings. It will, of course, be understood that there are alternate members providing rigidity for the extended frame of the house trailer and this disclosure is purely exemplary of a satisfactory method of accomplishing the result which can be made sufficiently decorative so as not to detract from the general appearance of the building in expanded position. It will further be apparent that an identical structure exists at the other end of the trailer in conjunction with the beam 48′ which is not specifically illustrated as it duplicates entirely the arrangement heretofore shown and described.

To understand how the expansible trailer of this invention operates, we will assume that the trailer has been towed to its site and is in basically the position as shown in FIG. 1 of the drawings. To expand the trailer the first step that is taken is to swing the members 27 and 30 laterally outward to the position shown in broken line in which position the inner ends 29 and 31 of these members will engage within the channels 25. The outer ends are supported by jack means 60 (FIG. 3) of the usual acme screw type and provide not only a support for the outer end of the beams 27 and 30 but also serve to level the beams with respect to the positioning of the main body of the house trailer. Located at the outer end of each of the beams 27 and 30 is a bracket 62 (FIGS. 8 and 9) of L shape on which is rotatably received a sheave 63 passing around this sheave is a cable 64 which extends back to a winch means generally designated 65 (FIGS. 10, 11) consisting of a pair of drums 66 and 67 which are fixed on a shaft 68, suitably received in a pair of bearings not shown which are mounted on the undercarriage of the trailer. Along the bottom edge of the end walls 40 and 42 a plurality of rollers 70 (FIGS. 3, 5, 8) are provided and inwardly from the outer edge of the endwall section 40 along the lower edge thereof a bracket 72 (FIGS. 8, 9) is fastened which bracket extends outward of the wall 40 with an L shape section 73 having a groove or bight 74 that is adapted to pass over the cable 64. The bight is engaged on the cable 64 and a pair of clamps 75, 76 are placed on either side of the cable so as to abut either edge of the portion 73, see FIG. 8. A similar arrangement exists at the other end of the trailer with identical drums for the cable appearing at the other end of the shaft 68 and in this position a crank 80 is placed on the end of the shaft 68 and the section consisting principally of the side wall 32, end walls 40 and 42 and the roof 34, 36 is drawn laterally outward from the body of the trailer substantially to the position shown in broken lines in FIG. 2. At this location the roof section 36 has been drawn over the edge of the main roof 24 and the floors 44 and 45 have begun to unfold into the attitude shown in the drawings, the auxiliary end wall section 42 is then swung into planal alignment with the wall section 40 drawing the bracing members 48 through the bail 55 and locking the same into planal position, at which location the rollers 70 under the wall 42 will be engaged with the upper web of the channel 27 for example. The expansion of the trailer is continued laterally outward until the free edge of the roof 36 having a notch 78 engages the projection 79 on the edge of the primary roof member 24 at which position the trailer is fully expanded with the floor sections 44 and 45 lying flat and the wall section 42 slightly overlapping the main end wall 20. A suitable weatherproof covering may be placed over the peak or ridge of the roof sections 34 and 36 and at the joint on valley between the roof section 36 and primary roof section 24. Also, additional weatherproofing is provided by suitable gasketing, that has been eliminated from the drawing for clarity, being provided at the other joints such as between the abutting edges of walls, 40, 42 and 42, 20 as well as between the upper edges of the walls 42 and the roof section 36. Similarly, a gasketing joint is provided between an inner face of the wall 42 and its abutting floor section 45.

With the trailer fully expanded additional pillars or support means such as the jacks 60 may be provided under the floor sections 44 and 45 substantially midway thereof to take the additional load provided by the length of the span and the structure is then ready for occupancy as a two-room housing unit.

It is of course apparent that a reverse procedure is had in collapsing the house trailer in which the expandible portion is moved telescopingly inward toward the main section of the trailer and then the walls 42 are folded back on top of the wall 40 and the complete telescoping is then permitted.

I claim:
1. A laterally expandible house trailer having a carriage frame adapted for mobility, a rectangular body section having end walls fixed to said frame, an extensible side section telescopically received over said body section, said side section having end walls, side wall and a roof, an auxiliary roof hingedly related to said extensible section roof along the longitudinal edge thereof remote from the said side wall, auxiliary end walls hingedly related to said extensible section end walls along the vertical edge remote from the said side wall so that the auxiliary end walls will overlie the extensible section end walls in folded position and partially overlie the body end walls in extended position, said extensible side section having a collapsible floor section, and laterally extendible frame members carried by said carriage frame adapted to support said extensible side section when extended.

2. A laterally expandible house trailer as in claim 1 wherein the roof of said extensible side section is oriented to provide a pitch angle with the side section end walls and the auxiliary end walls have their upper edges inclined to conform to said pitch angle of the roof.

3. A laterally expandible house trailer as in claim 1 wherein the roof of said extensible side section is oriented to provide a pitch angle with the side section end walls and the auxiliary end walls have their upper edges inclined to conform to said pitch angle of the roof and are hinged along their corresponding longer vertical sides.

A laterally expandible house trailer as in claim 1 wherein said frame members are pivoted to said carriage frame to swing from a position lengthwise of the frame to a position laterally thereof.

5. A laterally expandible house trailer as in claim 1 wherein said bracing member is pivoted at one edge of one of said auxiliary end walls and slidably related to the edge of the section end wall to which the auxiliary wall is hinged.

References Cited by the Examiner
UNITED STATES PATENTS
2,902,312   9/1959   Ferrera.
2,920,920   1/1960   Couse _____ 296—26
FOREIGN PATENTS
953,714   5/1949   France.

BENJAMIN HERSH, *Primary Examiner.*
P. GOODMAN, *Assistant Examiner.*